United States Patent [19]

Aubert

[11] Patent Number: 4,470,830

[45] Date of Patent: Sep. 11, 1984

[54] TREATING GASES WITH LIQUIDS

[75] Inventor: Raymond P. Aubert, Wescosville, Pa.

[73] Assignee: AT&T Technologies, Inc., New York, N.Y.

[21] Appl. No.: 506,231

[22] Filed: Jun. 20, 1983

[51] Int. Cl.³ .............................................. B01D 47/06
[52] U.S. Cl. .................................... 55/94; 55/95; 55/248; 55/249
[58] Field of Search .............. 55/94, 95, 244, 248, 55/249, 256, 223; 261/22, 117, 121 R

[56] References Cited

U.S. PATENT DOCUMENTS

| | | | |
|---|---|---|---|
| 1,620,826 | 3/1927 | Mitchell | 261/22 |
| 1,775,876 | 9/1930 | Vecchio . | |
| 2,612,745 | 10/1952 | Vecchio . | |
| 3,998,613 | 12/1976 | Attig | 55/256 |
| 4,005,999 | 2/1977 | Carlson | 55/244 X |

FOREIGN PATENT DOCUMENTS 402054  8/1941  Italy .................................. 261/117

*Primary Examiner*—Charles Hart

*Attorney, Agent, or Firm*—D. C. Watson

[57] ABSTRACT

Gas, such as exhaust gas from a silicon epitaxial reactor, is treated with a liquid such as water. A basin (12) holds a solution (20) including the liquid utilized to treat such gas in the manner intended. An inlet chamber (14) and a convenient self-cleaning passageway (46) introduce the gas into and below a first level (36) of solution (20) established within a treatment chamber (16) in the basin (12). Within delivery piping (44), pressure is provided for advancing the gas for treatment. The treatment chamber (16) is provided with sidewalls (28 and 30) having passageways (46 and 48, respectively), which cooperate with the gas pressure to establish multiple levels (36, 38 and 40) of solution (20) in basin (12) to seal chamber (16). Chamber (16) is also provided with heads (60-67) for spraying the liquid into the advancing gas to wet the same for a time sufficient to treat the gas. The passageway (48) in outlet wall (30) passes the gas from the treatment chamber (16) into and below a second, higher level (38) of solution (20) in basin (12) and the gas advances to the atomsphere.

12 Claims, 3 Drawing Figures

TREATING GASES WITH LIQUIDS

TECHNICAL FIELD

This invention relates to treating gases, including any substances therein, with a liquid and, more particularly, to advancing the gas through a sealed chamber wherein the liquid is sprayed into the gas.

BACKGROUND OF THE INVENTION

There are many and pervasive needs for treating gases (to include any substances therein), particularly for environmental purposes. Typically, the objective is to render such a gas physically clean and safe for plant and animal life by making it non-toxic and non-flammable. The physical cleaning may include removal of chemical and/or particulate matter, while toxicity and flammability may involve chemical reactions and/or dilution with safe substances. A popular treating expedient utilizes a liquid such as water to produce a waste gas and a waste solution which can be further treated by commonly available processes such as in waste treatment plants. When a gaseous waste requires both chemical reaction and physical cleaning, the treatment is a challenging task.

One such task is to treat gases exhausted from reactors used to grow layers of mono or polycrystalline material on wafers in semiconductor work. For example, the exhaust from a typical silicon reactor includes hydrogen, hydrogen chloride, various chlorosilanes and trace gases. The hydrogen can be very flammable in air, the hydrogen chloride is toxic and corrosive and the chlorosilanes may be flammable, toxic and corrosive. Conveniently, such gases react with or are absorbed by water to form soluble and/or deposition products and free hydrogen. A problem is to deliver the gases to a water treating process safely and efficiently.

The chlorosilanes tend to polymerize even in the absence of air to form fine particulates which may be gas-borne. They also polymerize in the presence of moisture to form stubborn deposits in delivery piping. Such deposits cause clogging and include substances which burn violently in air, especially during clean-out scraping.

Air should be excluded from the delivery piping to avoid hydrogen fires or a sufficient quantity should be utilized to safely dilute the hydrogen. Moisture should be excluded to avoid deposition reactions and consequent clogging. A problem is that air gets into conventional gas treating equipment. Subsequently, the air back-diffuses into the delivery piping carrying with it water mists which aggravate the delivery problem. One solution has been to continually purge the delivery piping with an inert gas such as nitrogen. A problem is that so much nitrogen is required to totally exclude the air and the mists that the resultant volume of nitrogen and waste gases causes excessive enlargement of the subsequent liquid treating equipment.

The equipment for treating gases with a liquid includes wet scrubbers for capture of particulate matter and absorption equipment for the dissolution and/or reaction of gases. Fortunately, the equipment for particulate removal with a liquid is similar and often identical to absorption equipment. Such equipment includes impingement apparatus, packed and plate towers, venturi devices, bubblers, spray apparatus, pumps and fans. The fans are generally used to dilute troublesome gas such as hydrogen so it represents less than 4% by volume of the combined air and hydrogen (the lower explosive limit of hydrogen in air).

Nearly all the above equipment has been tried in the past to treat gases from silicon reactors. For example, tower scrubbers packed with high surface media for developing water films have been tried and the media quickly clogged with deposition products. Horizontal gas flowing scrubbers having cross sprays were utilized with better but limited success. Multiple channel spray chambers were tried wherein the gas moved alternately with (co-current) and against (counter-current) the sprays with poor clogging experience. Scrubbers of both vertical and horizontal design were sometimes utilized with fans to draw ambient air to dilute the hydrogen for fire safety and to discourage back diffusion of mists into delivery piping. Unfortunately, such air flow added oxygen to accelerate deposition reactions, increased the overall size of expensive equipment and increased the volume of water and energy required to do the scrubbing. Also, when alternating spray chambers were employed, they were open to the atmosphere whereby air and water mists back-diffused into delivery piping even when nitrogen was utilized to move the reactor gases.

Accordingly, it is desirable to develop new and improved expedients for treating gases with liquids. Such expedients should include the ability to at least partially treat for toxicity, flammability and physical cleaning. The end products of such treatment should include gases and solutions which may be treated by available, common processes, e.g., air dilution and in conventional waste treatment plants. It is further desirable to include expedients for protecting gas delivery piping from undesirable back-diffusion of substances such as air and moisture. Hopefully, the size and cost of treating apparatus and the cost of operating the same may be minimized by improved expedients. One such expedient should facilitate diluting troublesome gases at the end and not the beginning of treatment so dilution gases need not be treated. Another expedient should facilitate spraying to obtain efficient treatment and adequate flushing of fast reacting deposits from apparatus. Still another expedient should facilitate advancing gases and reaction products through passageways that are self-cleaning or at least slow clogging.

SUMMARY OF THE INVENTION

Expedients are provided for treating gas and any substances therein including a basin for holding a solution containing a liquid utilized to treat such gas in the manner intended. Such expedients may include a convenient, self-cleaning passageway for introducing the gas into and below a first level of the solution established within a treatment chamber in the basin. The expedients also include sufficient pressure in the gas delivery piping for advancing the gas for treatment. The treatment chamber includes sidewalls and passageways therein which cooperate with the gas pressure to establish multiple levels of solution in the basin to seal the chamber. The chamber also includes heads for spraying the liquid into the advancing gas to wet the same for a time sufficient to treat the gas in the manner intended. An exit passageway in an outlet wall of the treatment chamber permits the gas to pass therethrough, into and below a second, higher level of solution in the basin. As the treated gas advances therefrom to the atmosphere, it may be further treated such as by dilution with air.

BRIEF DESCRIPTION OF THE DRAWING

The invention will be more readily understood from the following detailed description when read in conjunction with the accompanying drawing wherein.

Figure 1:
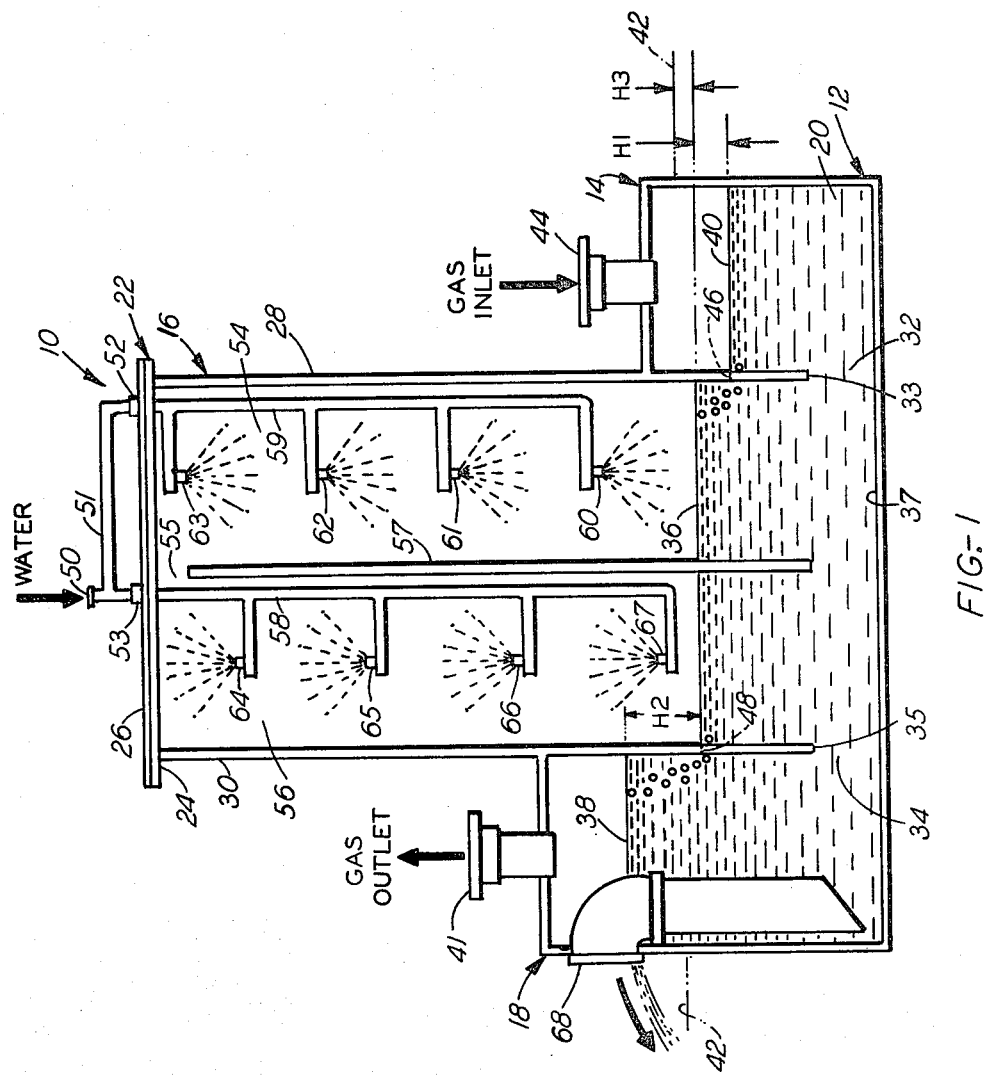
FIG. 1 is a schematic representation of expedients for treating gas with a liquid in accordance with the instant invention.

It can be seen that some features in the figures are abbreviated or simplified to highlight certain aspects of the invention. Also, where appropriate, reference numerals have been repeated in the figures to designate the same or corresponding features.

DETAILED DESCRIPTION

The Gases And Liquids

In the treatment of a gas, and particularly in the treatment of a gaseous waste with a liquid, intermediate and end products are often encountered which may lead to confusion in describing the treatment. Consequently, the ensuing discussion will include nomenclature and reasoning therefor to identify incoming, intermediate and outgoing matter involved in the treating according to the invention and an illustrative embodiment thereof.

It will be evident that the matter to be treated may be a gas or a mixture of gases including dissolved or entrained substances such as, but not limited to, particulate matter. It will also be evident that the included substances should be gas-borne. Accordingly, for the purposes of this application such matter shall be referred to as the gas to be treated, the inlet gas or merely as the gas delivered for treatment. In the illustrative embodiment, the gas referred to is the waste matter exhausted or purged from a typical epitaxial reactor previously mentioned for silicon work. The exhaust from such a typical reactor includes hydrogen, hydrogen chloride, various chlorosilanes, purging gases such as nitrogen, and trace gases. The exhaust may also include dissolved matter, particles of deposition reactions and matter gleaned from apparatus such as delivery piping.

The gas exhausted from a reactor is typically exposed to temperatures of up to about 1200° C. in the reactor chamber. However, the temperature drops rapidly as the exhausted gas is transported by heat resistant piping to a treatment area. The temperature of the delivered gas is below about 50° C. prior to being treated. The combined exhaust gas from five reactors has been estimated to contain about 40–45 CFM hydrogen, 1.0 to 1.5 CFM hydrogen chloride, 0.2 to 0.4 CFM silicon tetrachloride and lesser quantitles of silane, arsine, diborane, trichlorosilane, silicon dichloride and derivative gases. The inlet gas for treating according to the illustrative embodiment is assumed to come from only one reactor and amount to about one-fifth of the above estimated quantities. It should be emphasized, however, that the invention is not limited to exhaust gas from only one reactor or even to gas from epitaxial reactors. The discussion will show that the invention may be applied to many different gases requiring treatment for many different purposes. Also the apparatus may be scaled upward or downward to suit the quantity of gas to be treated.

The liquids for treating the gases are selected to achieve a desired result and to maintain a desired control of reactions which are expected to take place. Conventionally, the treating liquids have been referred to as absorbents although it seems that such term should be limited to liquids which absorb a chemical compound and remove it from a gas. Accordingly, the term liquid will be used in this application to refer to the treating agent; however, it is to be understood that such term does not necessarily refer to a pure liquid or even to only one liquid. For example, one could start treating with a pure liquid, with a mixture of liquids or with a mixture of chemicals in the form of a liquid. If such an agent is then even partially recirculated, the treating liquid becomes contaminated with absorbed, entrained or reaction products and becomes at least slightly different from the initial liquid.

The most pervasively used liquid for treating gases is probably water for many reasons including its well known property as a solvent. The gas described for the illustrative embodiment is conveniently treated in the manner intended utilizing water as the treating liquid. The action of water on the reactor gas is so rapid that one must avoid uncontrolled diffusion of moisture in undesired places with consequent build up of deposition products. Also, the water is so effective as a treating liquid that it may be applied in any of several known ways. A problem is to apply the liquid in a manner which enhances cleaning of treatment apparatus to avoid plugging pipes, nozzles and gas passageways.

According to the illustrative embodiment of the invention, the treating liquid is water which is applied by a spray technique. However, the invention is not limited to the use of water as the treating liquid; nor is it limited to the use of a particular spray technique. For example, it is known to treat a gas similar to that of the illustrative embodiment with 5% disodium carbonate in water as the treating liquid. Although such liquid has been sprayed onto chamber packing, it would be practical to spray the liquid in other known ways including a convenient method described hereinafter in the practice of the invention.

It is also known to use water to treat other gases. For example, hydrogen fluoride and silicon tetrafluoride gases are encountered in phosphoric acid and fertilizer plants wherein water is utilized as a reactant and absorbent liquid. Such treatment is believed amenable to the practice of the instant invention.

In treating a gas with a liquid one or more products are formed which may be characterized as intermediate or end products or both. Once the treating liquid has contacted the inlet gas, it can no longer be considered merely as fresh treating liquid. It will carry dissolved, absorbed or reactant matter along with it, generally forming a mixture which is hereafter designated in this application as a solution. Such solution can be said to contain the liquid utilized to treat the gas. The chemical and/or physical form of the liquid may be changed in the solution, but the greatest mass of solution is acquired from the treating liquid rather than from the inlet gas. Of course, if one elects to recirculate some or all of the solution for treating the gas, the content of the "liquid" and the "solution" will constantly change and the description of the invention could become confusing. Fortunately, in a presently preferred practice of the instant invention, the liquid comprises a flow of fresh water and no solution is recirculated. Such practice is selected in the description of the illustrative embodiment. Nevertheless, it is within the scope of the invention to practice recirculation and the embodiment selected is by way of description and not by way of limitation.

Another product typically generated in treating gas with a liquid includes gaseous matter generally containing one or more gases and moisture from the treating liquid. Here also, recirculation could be practiced whereby a portion of the gaseous matter could be withdrawn from the treatment chamber and introduced with the inlet gases. Such recirculation is not well known in the prior art although it should be included as within the scope of the invention. In the interest of simplicity, such recirculation will not be considered in the description of the illustrative embodiment.

According to the illustrative embodiment, the gaseous matter generated within the treatment chamber and above the solution is primarily wet hydrogen. Of course, trace amounts of hydrogen chloride and other gases may be present, but such amounts are so negligible that they do not warrant further discussion. There is found to be almost a complete absence of gas-borne particulate matter. The presence of hydrogen in both the inlet and product gases has been a matter of great concern in the prior art because of incipient flammability of hydrogen.

The scope of the invention should also include the production of many commercial products as well as the treatment of waste gases with a liquid. For example, household ammonia is produced by treating ammonia gas with water. Aqueous acids such as hydrofluoric and sulfuric are prepared by treating hydrogen fluoride and sulfur trioxide, respectively, with water. In such examples, the gases are contacted with a known quantity of water in such a manner that the solution gradually builds up to a desired assay. Until such assay is reached the more dilute solution could be considered an intermediate product.

Any intermediate products generated by the treatment according to the illustrative embodiment will be designated according to their location or condition. For example, the intermediate gaseous products generated by spraying will be referred to as chamber gases or treated gases and the gaseous end products will be referred to as effluent or outlet gases. Also, the intermediate solution will be referred to as chamber solution or merely as solution, and the end product thereof will be referred to as effluent or outlet solution.

The Treatment

The treatment of gases according to the invention is best explained by reference to FIG. 1 wherein the apparatus for achieving the treatment is shown somewhat schematically and is designated generally by the numeral 10. The apparatus 10 includes a basin supporting an inlet chamber 14, a treatment chamber 16 (also referred to as a spray chamber 16) and an outlet chamber 18. Basin 12 also supports and contains a solution 20 which is free to communicate between the chambers 14, 16 and 18.

Chamber 16 comprises sidewalls which will be described and a roof structure designated generally by the numeral 22. Roof structure 22 further includes a peripheral flange 24 and a plate 26 which is removable for maintenance purposes. FIG. 1 further shows inlet and outlet walls 28 and 30, respectively, to the right and left sides of chamber 16 although the function of such walls could as readily be served by selecting any walls between chamber 16 and the inlet and outlet chambers 14 and 18. Inlet and outlet walls 28 and 30 extend only partially into the solution 20 in basin 12 forming extensive openings 32 and 34, respectively, between bottom edges 33 and 35 of the walls and the bottom 37 of basin 12. Such openings are sufficiently large and so disposed to permit circulation of solution 20 and substances therein at least along the bottom 37 of basin 12. Such circulation extends into and out of the chambers without permitting ambient air to enter the treatment chamber 16.

One of the major problems in the prior art in treating gas with a liquid has been an inability to control gas migration and gas reactions. For example, ambient air is generally permitted and often encouraged to enter and even to flow through a treatment chamber. Such practice is particularly utilized where an incipiently flammable gas is present at the inlet to and/or emitted from the treatment in chamber 16. Yet the presence of ambient air (or an equivalent purge gas) places a burden upon and upwardly increases the size of treating apparatus. Moreover, the presence of air may be further deleterious when a component such as oxygen causes undesirable reactions. When gas reactions produce substances which burn violently in air, the presence of ambient air may be hazardous. Consequently, in the practice of the invention, treatment chamber 16 remains fully sealed even when gases and liquids are not flowing. A concomitant duty follows from sealing the treatment chamber 16. Pressures therein must be controlled to protect the sidewall enclosure and passage of gases, solution and substances into and out of chamber 16 must be facilitated without breaking the seal.

It will be noted in FIG. 1 that there are three different levels of solution in basin 12 when gases are flowing therethrough. Such levels are selected to seal chamber 16 and cause only a tolerable backpressure on the inlet gas and, therefore, on the gas-producing equipment such as the illustrative silicon reactors.

For purposes of illustration the level of solution in treatment chamber 16 is denoted a first level 36, the level in outlet chamber 18 is denoted a second level 38 and the level in inlet chamber 14 is denoted a third level 40. Analysis of the levels starts at level 38 which is exposed to ambient pressure in the illustrative embodiment. In this case, mainly wet hydrogen is being exhausted to the atmosphere at piping 41, although in very low volumes. Hydrogen is not known to be toxic and because of the low quantities, the entrained moisture does not pose a threat to the environment depending upon the location and method of exhaust. In this case, it is provided that the hydrogen is exhausted from piping 41 up to a point (not shown) well above ground eddy currents and it is amply diluted with air. Accordingly, pockets of gas containing flammable concentrations are avoided externally of the treatment process.

The difference (H2) in height between the first and second levels of solution is set at about 4 inches in the illustrative embodiment and the difference (H1) in height between the first and third levels is set at about 2 inches. Such settings are made with many considerations in mind. For example, the difference between the second and third levels is H1+H2=6 inches which corresponds to about 0.22 p.s.i.g. and is a tolerable back pressure on the reactors. The first level 36 provides a water column H2 of about 4 inches which corresponds to about 0.15 p.s.i.g., found to be a tolerable pressure in chamber 16 according to its construction. Levels 40 and 36 are also set to account for pressure and other equilibrium conditions which take place when the gas and liquid flows are stopped. In the illustrative example shown schematically in FIG. 1, the solution 20 will seek a level 42 wherein the outlet chamber 18 gives up solution and the inlet chamber 14 takes on solution and the overflow stops. Of course, such a condition is based on the gas-producing reactors being opened, thereby exposing delivery piping 44 to the same ambient pressure as that experienced in outlet chamber 18. Under such equilibrium conditions chamber 16 should advantageously remain at least slightly above ambient pressure to maintain its sealed condition. Consequently, levels 40 and 36 are also selected so the equilibrium level 42 of the basin solution 20 is sufficiently high to provide a height H3 of about 1 inch which corresponds to about 0.04 p.s.i.g. which is adequate to maintain a proper seal in chamber 16. Of course, all such settings and pressures are for illustration only and not by way of limitation. One of ordinary skill in the art may with little experimentation determine similar settings based on the gas being treated, the equipment producing the gas, the solution density and the size and construction of apparatus 10.

The liquid level settings are conveniently controlled in apparatus 10 by providing gas passageways 46 and 48 in the inlet and outlet walls 28 and 30, respectively. Such passageways may be merely openings or slots but, in a presently preferred embodiment of the invention, such passageways are novel weirs which will be explained hereinafter with respect to FIG. 3.

According to conventional expedients for treating gas with a liquid, the treatment chamber 16 would normally have a series of alternating vertical or horizontal baffles to provide a tortuous path for obtaining residence time in treating the advancing gas. Also, there would typically be perforated panels, fiber mats and/or other film producing media packed within chamber 16. Such expedients are an aid to dissolution, absorbing and reacting and are within the scope of the invention. They may be utilized in conjunction with liquid sprays as the treatment requirements dictate.

However, in the illustrative embodiment, the gas and substances therein are so sensitive to moisture that it is desirable to minimize any treatment outside and to contain it within chamber 16. For example, it is known that silicon halides such as $SiCl_4$, $SiHCl_3$, $SiH_2Cl_2$ and others decompose in water to form silicic acid, $SiO_2$ and silica gel. Silicic acid may be in solution or gelatinous form, behaving as a colloid. $SiO_2$ may be considered dehydrated silica which forms crusty, stubborn deposits on apparatus and silica gel is an inoffensive adsorbent used to scavenge for water in moth-balled equipment.

From the above description of reaction products it is clear that silicic acid is the most readily handled matter. From observing operation of the illustrative embodiment, it seems that the stubborn $SiO_2$ product is kept to a minimum. Accordingly, it is theorized that the silicon halides are maintained in a desirable, substantially unreacted state until exposure to spray in chamber 16. Then the halides are exposed to sufficient water so rapidly that production of the readily handled silicic acid is facilitated. Of course, the hydrogen chloride gas component is also maintained in a desirable, substantially unreacted state until treatment whereby it is present to encourage formation of colloidal silicic acid. Such theory is offered by way of explanation and not by way of limitation since the decomposition of such unreacted gases in the shocking presence of water sprays is not fully known to chemists.

Referring again to FIG. 1, an advantageous array of liquid sprays is seen which has been found to provide unexpectedly good results inherent in the above explanation. A water supply (about 2 gpm for gas from one reactor) is introduced into the treatment piping at inlet 50. From thence the water advances within a manifold 51 to bulkhead fittings 52 and 53 installed in roof panel 26. Within chamber 16, compartments 54 and 56 are formed by an intermediate baffle 57 to guide the advancing gas through a passageway 55 and to separate the effects of spray manifolds 58 and 59. Manifold 59 feeds spray nozzles 60–63 and manifold 58 feeds spray nozzles 64–67.

In the conventional teaching of spraying liquids into reactive gases, co-current spraying is propounded to move deposition products along the path followed by the gas. By this is meant that the direction in which the water is sprayed should be the same as the direction in which a current of gas is advanced. However, applicant has found in the illustrative embodiment that better results are obtained by practicing counter-current spraying. Perhaps such practice provides a shocking presence of water to the unreacted gases and helps to substantiate the theory of predominate silicic acid formation set forth above. It is further found, at least in spray compartment 56, that such counter-current spraying does a fine job of cleaning chamber walls (including roof plate 26) and the spray piping.

FIG. 1 further shows piping 68 for outlet solution wherein a leg extends to the bottom of basin 12 providing a seal to prevent drain system gases from backflowing and mingling with outlet gases from treatment. Also, reaction products are removed from the bottom with the effluent solution to minimize accumulation of stubborn deposits and consequent plugging of piping 68. It should be noted that the effluent solution from apparatus 10 may often be a commercial product; however, in the illustrative embodiment the effluent solution is acidic and contains some toxic substances. Therefor, such solution requires further treatment which is conveniently provided by common waste plants.

In operation of apparatus 10, liquid is first introduced at entrance fitting 50 from whence it is conducted and sprayed into basin 12 at least until overflow is noted at outlet piping 68. Thus, chamber 16 is originally filled and sealed with ambient air which may be purged by utilizing an inert gas such as nitrogen to prevent unwanted reactions. The gas to be treated is then delivered to chamber 14 where it is introduced into and below a first level 36 of the solution as it advances through passageway 46 and into chamber 16. Liquid is sprayed into the gas from spray heads 60–67 as such gas advances through chamber 16 to passageway 48. The gas is then passed therethrough into and below a second higher level 38 of solution 20 in chamber 18 from which the effluent gas advances to the atmosphere. When reactor operation ceases, the spraying may or may not be continued, depending upon the time needed to recycle and start a new reactor operation.

Treatment Apparatus

Figure 2:
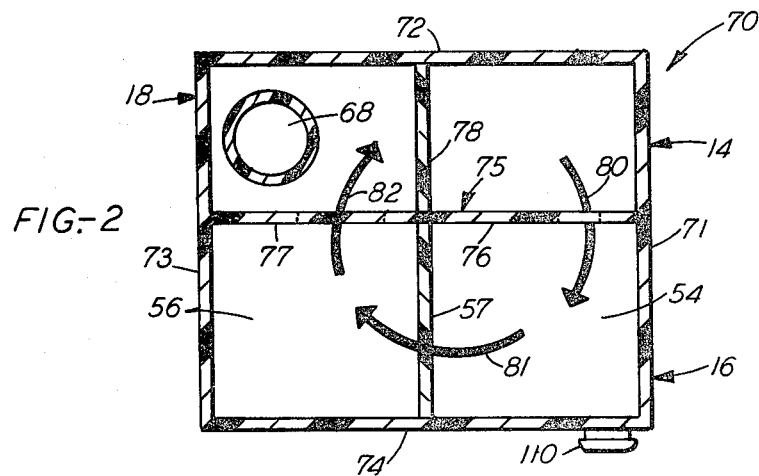
FIG. 2 is a cross-sectional, plan view of a presently preferred embodiment of the invention taken along line 2—2 in FIG. 3.
Figure 3:
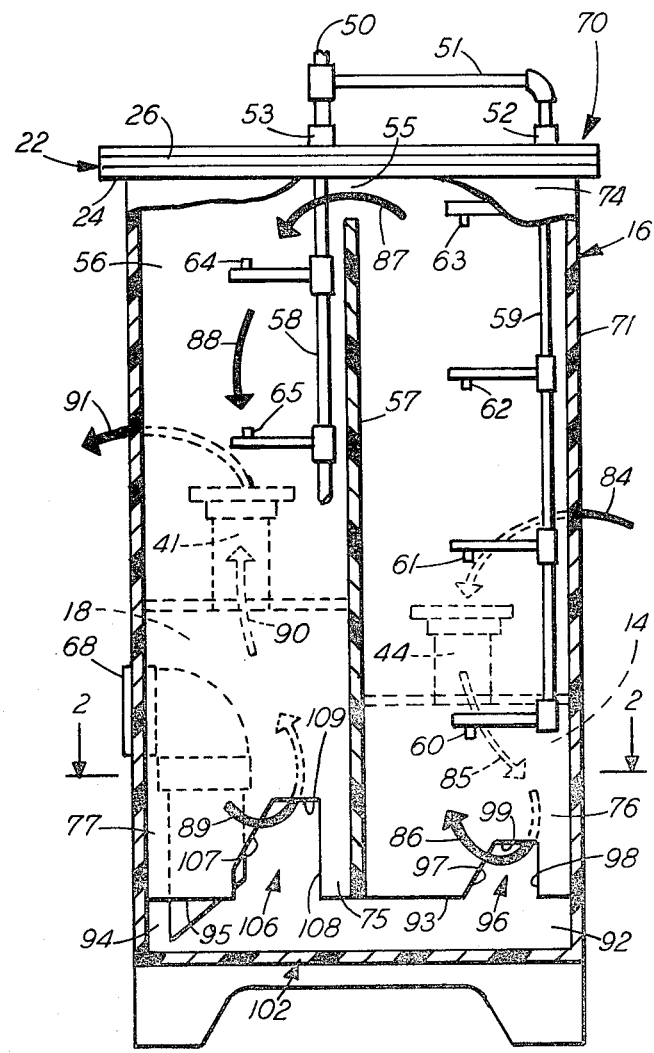
FIG. 3 is a front view of the embodiment shown in FIG. 2 wherein a front wall is cut away to reveal internal features.

The apparatus 10 is depicted somewhat schematically in FIG. 1 to simplify description of the invention. Another advantageous apparatus which has many of the features of apparatus 10 in a different layout is shown in FIGS. 2 and 3, designated generally by the numeral 70. FIG. 3 is an elevation view with a front wall cut away and FIG. 2 is a sectional plan view taken along line 2—2 in FIG. 3.

It is evident that FIG. 1 shows a linear embodiment of the invention wherein inlet and outlet chambers 14 and 18, respectively, are affixed to each end of treatment chamber 16. Apparatus 70 provides a convenient embodiment of the invention wherein the inlet and outlet chambers are efficiently arranged behind treatment chamber 16 in a compact manner. Consequently, chamber 14 and compartment 54 utilize a continuous wall panel 71, chambers 14 and 18 utilize a wall panel 72, chamber 18 and compartment 56 utilize a wall panel 73 and compartments 56 and 54 of chamber 16 have a common front panel 74. Compartments 54 and 56 share baffle 57 as in apparatus 10 and treatment chamber 16 has a rear panel 75 shared respectively with chambers 18 and 14. However, rear panel 15 is modified to have a functional inlet portion 76 and a functional outlet portion 77. Advantageously, chambers 14 and 18 share a common wall 78.

FIG. 2 clearly shows by arrows 80-82 that the inlet gas flows from inlet chamber 14 to treatment chamber 16, and the outlet gas flows from chamber 16 to outlet chamber 18 in a nearly circular pattern. However, the flow of solution is not nearly as straight forward and is not indicated in FIGS. 2 and 3. Nevertheless, it has been observed that the solution is generated in chamber 16 from whence it flows to outlet chamber 18 and exits by way of piping 68. A small portion of the originally generated solution backflows into and fills chamber 14 at least to the level 38 as shown in FIG. 1. Although thermal currents may to some extent cause circulation into and out of chamber 14, it is believed beneficial that the liquid therein be substantially undisturbed. An absence of agitation and splashing is believed useful to avoid mist generation and unwanted reactions in the delivery piping.

FIG. 3 also shows the flow of gas through apparatus 70 including vertical flow in treatment chamber 16. For example, inlet gas is delivered to piping 44 according to arrow 84 and enters chamber 14 according to arrow 85. Such gas is introduced from chamber 14 into chamber 16 for treatment according to arrow 86. Such introduction is made via inlet wall portion 76 of wall 75 utilizing a novel passageway which will now be described.

In a manner corresponding to apparatus 10, lower openings 92 and 94 have been formed by installing baffle 57 and wall 75 so that bottom edges 93 and 95 are suspended above a basin 102. An inverted weir-like notch 96 has been cut vertically into wall portion 76 at the bottom edge 93. Notch 96 has at least one side portion 97 tapering downwardly and away from the opposite side portion 98. A top portion 99 of the inverted weir is less wide than wall portion 76 and is strategically located with respect to the first spray head 60 for reasons to be explained.

It can be seen in FIG. 1 that inlet wall 28 is distantly apart from the bottom of baffle 57 so there is little likelihood that inlet gas will bypass compartment 54. However, in FIG. 3, it is seen that the inlet wall portion 76 extends to baffle 57. Accordingly, the top portion 99 of notch 96 is so located in apparatus 70 that a desired current of gas flowing according to arrow 86 will pass under top 99, through notch 96 and upwardly through solution (not shown) toward spray head 60.

The shape of notch 96 also adds an advantageous feature to apparatus 70. By reference to FIG. 1, the level 40 of solution 20 in chamber 14 is readily observed. Such level changes according to backpressure generated by solution heights H1 and H2. If and when reaction products or entrained waste begins to build up in passageway 46 in FIG. 1 or notch 96 in FIG. 3, the backpressure in inlet chamber 14 will increase. Level 40 (FIG. 1) will then be depressed and H1 will increase according to the increase in backpressure. According to apparatus 70, however, the notch 96 gets wider as a solution level in chamber 14 gets lower. Consequently, there is more opening to pass both the inlet gas and troublesome matter appearing at the notch 96. Of course, even without the tapered portion 97, a lowering of solution level in chamber 14 produces more opening in notch 96 to pass offending matter. An advantage of the tapered portion 97 is that an increasingly larger increment of opening is obtained by each increment that a solution level is lowered. Consequently, sufficient opening is gained with a tolerable lowering of solution. The offending matter is generally quickly removed from notch 96 by gas flowing therethrough in a self-cleaning manner and a tolerable backpressure is readily re-established.

After the inlet gas emerges from solution, it flows seriatim into and is expelled from spray generated by nozzles 60-63. Then the gas passes over baffle 57, through passageway 55 and into sprays from nozzles 64-67 (nozzles 66 and 67 are not shown in FIG. 3). Arrows 87 and 88 indicate the current of gas, and arrow 89 shows that the treated gas is passed from chamber 16 through another inverted "V" notch weir designated generally by the numeral 106. Notch 106 has features such as a tapered side 107, an opposite side 108 and a top portion 109 which are similar in appearance and function to the counterparts shown and explained for inlet notch 96.

It should be noted (FIG. 3) that the settings of the top portions 99 and 109 are shown to correlate with the settings for passageways 46 and 48 in FIG. 1. Accordingly, apparatus 70 is designed to accommodate a service similar to that described for apparatus 10 but utilizing a different layout and different passageways exemplified in self-cleaning weirs 96 and 106. It is incidentally seen in FIGS. 2 and 3 that basin 102 may be completely drained utilizing low, side outlet piping 110.

Alternate Embodiments

There have been illustrated herein certain embodiments of the invention and certain applications of the embodiments. Nevertheless, it is to be understood that various modifications and refinements may be made and utilized which differ from these disclosed embodiments without departing from the spirit and scope of the present invention.

For example, apparatus 10 and 70 have two compartments wherein counter-current spraying of a liquid into a gas is practiced. Such a number and size of compartments was selected in the illustrative embodiment to teach treatment of exhaust gas from a typical silicon reactor. Yet it is within the spirit of the invention to utilize more or fewer compartments of different size to suit the treating liquid, the delivered gas and a proper residence time to suit expected reactions. Although, counter-current spraying is found advantageous according to the illustrative embodiment, one could as well practice co-current spraying or other types of spraying if reactive conditions of liquid and gas so permitted.

The inverted "V" notch weirs were described with respect to apparatus 70 as being placed for strategic purposes at given positions. Nevertheless, one may wish to experiment to determine a most advantageous position or to change positions and height settings to suit different liquids and gases. Consequently, it is within the scope of the invention to make adjustable the weir heights and, to some degree, the weir openings. By such adjustability, one can readily try different heights to obtain different seals on chamber 16 and different backpressures on the inlet gas.

Although recirculation of solution from a basin to the spray nozzles is not always needed for proper treatment, such is also within the scope of the invention and in some cases may be mandated. For example, one may well want to build up acidity in the liquid being sprayed to treat the illustrative silicon halide compounds. Since hydrochloric acid is formed in the treatment, recirculation of solution would build acidity in the liquid which may sometimes be preferred. In other treatments such as in making agueous ammonia, hydrofluoric acid or sulfuric acid, one would recirculate solution and add only enough water to control heat until a desired assay builds up in a batch of solution. These are merely offered as theoretical examples to explain how conditions may be varied to obtain a desired result in the practice of the instant invention.

What is claimed is:

1. Apparatus for treating gas including any substances therein, comprising:
   a basin for holding a solution including a liquid utilized to treat such gas in the manner intended;
   a treatment chamber disposed in the basin and having sufficient space for treatment above the solution in the basin;
   means for introducing the gas into the basin and passing the gas below a first level of the solution established within the treatment chamber portion of the basin and for advancing the gas for treatment in the treatment chamber;
   the treatment chamber including means, in cooperation with the gas advancing means, for establishing multiple levels of solution in the basin to seal said chamber and means in the space above the solution in the basin for spraying the liquid into the advancing gas to wet the same for a time sufficient to treat the gas in the manner intended; and
   means for passing the gas from the treatment chamber into and below a second, higher level of the solution in the basin and for advancing the gas to the atmosphere.

2. Apparatus as in claim 1 wherein the treatment chamber further comprises:
   two openings, at least one in an inlet and at least one in an outlet wall, respectively, of the treatment chamber, each sufficiently large and disposed to permit circulation of the solution and substances therein at least along the bottom of the basin into and out of the treatment chamber without permitting ambient air to enter and destroy the sealing of the treatment chamber.

3. Apparatus as in claim 2, further comprising at least in an inlet wall of the treatment chamber:
   an inverted weir-like notch extending vertically into a bottom edge of the wall at the opening for circulation in the basin, said notch having at least one side portion tapering downwardly and away from an opposite side portion such that a liquid level on one side of the chamber wall extends to an increasingly wide passageway for gas and any matter to advance through the notch as such level is lowered; and
   at least the top of the inverted weir being less wide than the wall and so located with respect to the spray means that a desired current of gas flows under the top of and through the notch and upwardly through the solution toward a desired portion of spray in the chamber.

4. Apparatus as in claim 2 wherein the means for introducing the gas includes means for advancing the gas in a desired current and wherein the treatment chamber further comprises:
   means for spraying the liquid in a direction counter to the current of and into the gas.

5. Apparatus as in claim 2 wherein the means for introducing the gas further comprises in cooperation with the treatment chamber:
   means for introducing the gas at a desired third level, lower than the first and second levels, such that the difference in elevation between the second and third levels provides a tolerable backpressure on the gas being introduced.

6. Apparatus as in claim 2 wherein the means for passing the gas further comprises in cooperation with the treatment chamber:
   means for passing the gas from a first level selected so the difference in elevation between the first and second levels imposes a pressure on the treatment chamber tolerable for its construction yet, when water and gas flows are stopped and the basin solution seeks an equilibrium level, such equilibrium level is sufficiently high to maintain the seal on the treatment chamber.

7. A method of treating gas including any substances therein, comprising:
   holding, in a basin, solution including a liquid utilized to treat such gas in the manner intended;
   introducing the gas into the basin and passing the gas below a first level of the solution established within a treatment chamber disposed in the basin having sufficient space for treatment above the solution in the basin;
   advancing the gas for treatment within said treatment chamber including establishing multiple levels of solution in the basin to seal said treatment chamber and, in the space above the solution, spraying the liquid into the advancing gas to wet the same for a time sufficient to treat the gas in the manner intended; and
   passing the gas from the treatment chamber into and below a second, higher level of the solution in the basin and advancing the gas to the atmosphere.

8. The method of claim 1, further comprising:
   permitting circulation of solution in the basin through two openings, at least one formed in an inlet and at least one formed in an outlet wall, respectively, of the treatment chamber, each sufficiently large and disposed to permit circulation of the solution and substances therein at least along the bottom of the basin into and out of the treatment chamber without permitting ambient air to enter and destroy the sealing of the treatment chamber.

9. The method of claim 2, further comprising as part of the introducing and advancing steps:

introducing the gas at an inverted weir-like notch extending vertically into a bottom edge of the wall at the opening for circulation in the basin, said notch having at least one side portion tapering downwardly and away from another side portion such that a liquid level on one side of the chamber wall extends to an increasingly wide passageway for advancing gas and any matter through the notch as such level is lowered; and advancing the gas under a top portion of the inverted weir such top portion being less wide than the wall and so located with respect to the spraying that a desired current of gas flows under the top of and through the notch and upwardly through the solution toward a desired portion of spray in the chamber.

10. The method of claim 2 wherein the steps of introducing and advancing the gas include advancing the gas in a desired current, further comprising:

spraying the liquid in a direction counter to the current of and into the gas.

11. The method of claim 2 wherein the step of introducing the gas further comprises in cooperation with the advancing step:

introducing the gas at a desired third level, lower than the first and second levels, such that the difference in elevation between the second and third levels provides a tolerable backpressure on the gas being introduced.

12. The method of claim 2 wherein the step of passing the gas further comprises:

passing the gas from a first level selected so the difference in elevation between the first and second levels imposes a pressure on the treatment chamber tolerable for its construction yet, when water and gas flows are stopped and the basin solution seeks an equilibrium level, such equilibrium level is sufficiently high to maintain the seal on the treatment chamber.

* * * * *